United States Patent
Iwai et al.

(10) Patent No.: US 7,784,594 B2
(45) Date of Patent: Aug. 31, 2010

(54) BRAKE PAD ASSEMBLY FOR A BICYCLE DISC BRAKE

(75) Inventors: Toru Iwai, Sakai (JP); Yoshikazu Kashimoto, Sakai (JP)

(73) Assignee: Shimano Inc., Sakai, Osaka (JP)

( * ) Notice: Subject to any disclaimer, the term of this patent is extended or adjusted under 35 U.S.C. 154(b) by 489 days.

(21) Appl. No.: 11/866,375

(22) Filed: Oct. 2, 2007

(65) Prior Publication Data

US 2009/0084642 A1     Apr. 2, 2009

(51) Int. Cl.
*F16D 69/00* (2006.01)

(52) U.S. Cl. .............. 188/251 M; 188/250 R; 188/250 G

(58) Field of Classification Search ............. 188/251 M, 188/250 R, 258, 251 A, 251 E, 73.37, 250 G, 188/250 B
See application file for complete search history.

(56) References Cited

U.S. PATENT DOCUMENTS

| 6,303,236 | B1 | 10/2001 | Nakao | |
| 6,491,144 | B2 | 12/2002 | Ueda | |
| 2002/0189910 | A1* | 12/2002 | Yano et al. | 188/73.37 |
| 2004/0222055 | A1* | 11/2004 | Niwa et al. | 188/250 E |
| 2005/0269175 | A1* | 12/2005 | Iwai et al. | 188/251 A |
| 2007/0068750 | A1 | 3/2007 | Hara | |
| 2009/0255766 | A1* | 10/2009 | Kappagantu et al. | 188/73.37 |

FOREIGN PATENT DOCUMENTS

| JP | 2679162 B2 | 4/1990 |
| JP | 2000-233254 A | 8/2000 |
| JP | 2000-274462 A | 10/2000 |

* cited by examiner

*Primary Examiner*—Melanie Torres Williams
(74) *Attorney, Agent, or Firm*—Jeffer Mangels Butler & Marmaro LLP

(57) ABSTRACT

Disclosed herein is a brake pad assembly for a disc brake on a bicycle, the brake pad assembly comprising a brake friction pad and a back plate. The back plate includes a first layer deposited onto the brake friction pad and a second layer deposited onto the first layer. The first layer is made of an aluminum alloy and the second layer is made of a stainless steel.

5 Claims, 1 Drawing Sheet

BRAKE PAD ASSEMBLY FOR A BICYCLE DISC BRAKE

FIELD OF THE INVENTION

The present invention relates to a brake pad assembly for a disc brake on a bicycle. More specifically, the present invention relates to an aluminum-stainless steel clad back plate of a brake pad assembly for a bicycle disc brake.

BACKGROUND OF THE INVENTION

A disc brake is a device for slowing or stopping the rotation of a wheel. To stop the wheel, friction material in the form of brake pads is forced mechanically, hydraulically, pneumatically, or electromagnetically against both sides of the disc. Friction causes the disc and the attached wheel to slow or stop. The brake assembly typically includes a back plate. The conventional back plate is comprised of materials that generally cannot withstand high temperatures. For example, the conventional back plates are susceptible to deformation at high temperatures.

SUMMARY OF THE PREFERRED EMBODIMENTS

In accordance with a first aspect of the present invention, there is provided a brake pad assembly for a disc brake on a bicycle. The brake pad assembly includes a brake friction pad and a back plate comprising first and second layers. The first layer comprises an aluminum alloy and the second layer comprises stainless steel.

In accordance with another aspect of the present invention, there is provided a brake pad assembly for a disc brake on a bicycle. The brake pad assembly includes a brake friction pad and a back plate comprising a first layer deposited onto the brake friction pad and a second layer deposited onto the first layer. The first layer comprises an aluminum alloy and the second layer comprises a stainless steel.

In accordance with another aspect of the present invention, there is provided a brake pad assembly for a disc brake on a bicycle. The brake pad assembly includes a brake friction pad and a back plate comprising a second layer deposited onto the brake friction pad, and a first layer deposited onto the second layer. The second layer comprises a stainless steel and the first layer comprises an aluminum alloy.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
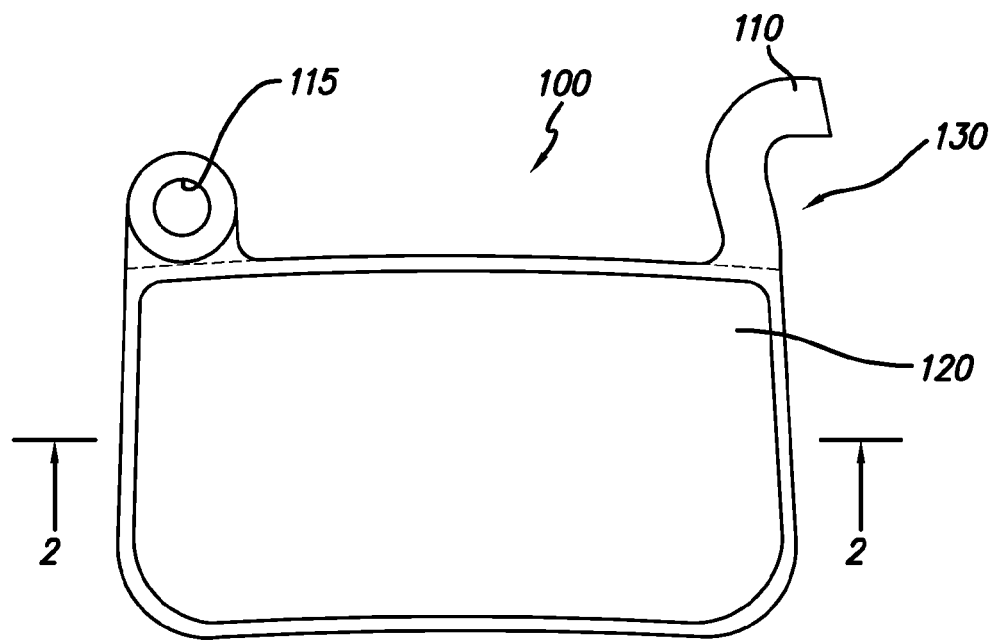
FIG. 1 is a front plan view of a brake pad assembly showing the brake friction pad and the back plate.

As shown in the drawings, for purposes of illustration, the invention is embodied in a brake pad assembly for a disc brake on a bicycle.

It will be appreciated that terms such as "front," "back," "top," "bottom," "left," "right," "horizontally" and "side" used herein are merely for ease of description and refer to the orientation of the components as shown in the figures. It should be understood that any orientation of the brake pad assembly, and the components thereof described herein, is within the scope of the present invention.

Figure 2:
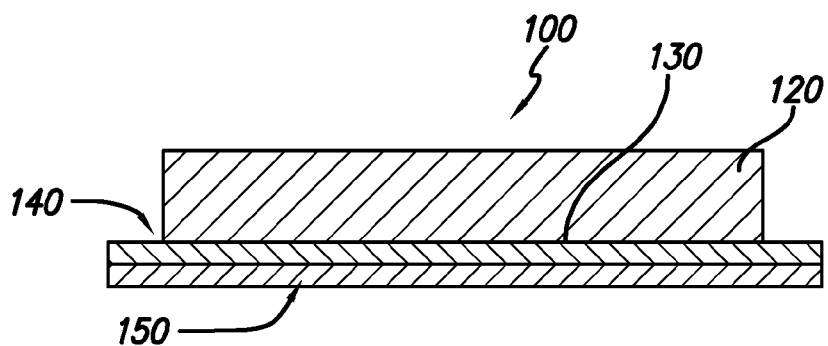
FIG. 2 is a cross-sectional view of the brake pad assembly of FIG. 1 taken along the line 2-2 showing a preferred embodiment of the back plate of the present invention.
Figure 3:
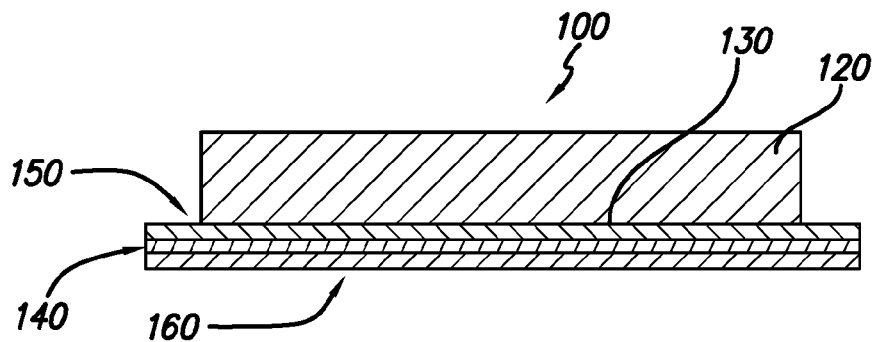
FIG. 3 is a cross-sectional view of the brake pad assembly of FIG. 1 taken along the line 2-2 showing a preferred embodiment of the back plate of the present invention.

Referring to FIGS. 1-3, preferred embodiments of a brake pad assembly 100 for a disc brake on a bicycle are shown and described. Generally, the brake pad assembly 100 includes a brake friction pad 120 and a back plate 130.

For example, the present invention may be used with a number of disc brake systems, including hydraulic bicycle disc brake systems such as those described in U.S. Pat. No. 6,491,144 (the "'144 Patent") and/or U.S. Publication No. 2007/0068750, the entireties of which are incorporated herein by reference. However, the present invention is not limited to any particular hydraulic disc brake system. Thus, the disclosures of the '144 Patent and U.S. Publication No. 2007/0068750 are referenced herein to illustrate preferred embodiments of the present invention only.

Referring now to FIG. 1, brake pad assembly 100 for a disc brake on a bicycle includes the brake friction pad 120 and the back plate 130. The back plate 130 includes a hooked-shaped locking part 110 and a round support part 115. The hooked-shaped locking part 110 preferably connects back plate 130 to a caliper housing. The round support part 115 preferably provides support for advancing and retracting the back plate 130. In a preferred embodiment, back plate 130 is about 1.7 mm to about 1.8 mm in thickness. However, the back plate 130 may be thicker or thinner than the foregoing.

FIG. 2 shows brake pad assembly 100 in cross-section. In a preferred embodiment, back plate 130 includes a first layer 140 and a second layer 150. Preferably, first layer 140 is deposited onto brake friction pad 120, and second layer 150 is deposited onto first layer 140. However, it is to be understood that second layer 150 may be deposited onto the brake friction pad 120, and first layer 140 may be deposited onto second layer 150, without departing from the scope of the present invention.

Preferably, first layer 140 comprises an aluminum alloy, and second layer comprises 150 a stainless steel. However, it is to be understood that first layer 140 and/or second layer 150 may comprise other materials, such as aluminum alone.

In the embodiment shown in FIG. 2, first layer 140 and second layer 150 are each preferably of the same or similar thickness, each from about 0.85 mm to about 0.9 mm in thickness. However, first layer 140 and/or second layer 150 may be thicker or thinner than the foregoing.

FIG. 3 shows another preferred embodiment of the present invention. In this embodiment, back plate 130 includes first layer 140, second layer 150, and a third layer 160. Preferably, the second layer 150 is deposited onto the brake friction pad 120, the first layer 140 is deposited onto the second layer 150, and the third layer 160 is deposited onto the first layer 140. However, it is to be understood that the first 140, second 150, and third layers 160 may be deposited onto the brake friction pad 120 and/or each other in any order. In addition, the first layer 140 may be deposited onto the brake friction pad 120, the second layer 150 may be deposited onto the first layer 140, and a fourth layer (not shown) may be deposited onto second layer 150. In another embodiment, brake pad assembly 100 may only comprise one layer, such as first layer 140 or second layer 150, or more than three layers, without departing from the scope of the present invention.

Preferably, the first layer 140 comprises an aluminum alloy, and the second layer 150 and third layer 160 comprise stainless steel 150. The fourth layer described above may also comprise an aluminum alloy. Preferably, the second layer 150 and the third layer 160 comprise the same material. However, it is to be understood that first layer 140 may comprise other metals, such as aluminum, without departing from the scope of the present invention.

In the embodiment shown in FIG. 3, first layer 140 is about twice as thick as second layer 150 or third layer 160. Preferably, first layer 140 is about 0.9 mm in thickness, and second layer 150 and third layer 160 are each about 0.4 mm to about 0.45 mm in thickness. However, first layer 140, second layer 150, and/or third layer 160 may be thicker or thinner than the foregoing.

In each embodiment, aluminum alloys used in the present invention are alloys of aluminum, often with another metal, such as copper, iron, zinc, manganese, silicon, magnesium, titanium, chromium, or the like. They may be of the wrought or cast type, or any other type as is known in the art, such as any of the alloys designated by the International Alloy Designation System and/or Aluminum Association system. In each embodiment, the stainless steel used in the present invention may be any stainless steel known in the art, such as any grade of stainless steel and/or any standardized steel known in the art. In addition, the aluminum alloy and the stainless steel used in the present invention may be made by any manufacturing process known in the art.

In each embodiment, the layers are deposited onto the brake friction pad and/or onto each other using electroplating/electrodesposition, sputtering, or any other methods known in the art.

In each embodiment, the weight of the back plate 130 is about 5.3 g (as the weight of an all stainless steel back plate is about 6.5 g and the weight of an all aluminum back plate is about 4.0 g). However, the weight of the back plate 130 may be more or less than the foregoing weight, without departing from the scope of the present invention.

The embodiments described above are exemplary embodiments of the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A brake pad assembly for a disc brake on a bicycle comprising:
    (a) a brake friction pad and
    (b) a back plate comprising a hook-shaped locking part and a round support part having an opening defined therein, wherein the back plate, including the hook-shaped locking part and the round support part, is comprised of first and second layers, wherein the first layer is deposited directly onto the brake friction pad and comprises an aluminum alloy and the second layer is deposited directly onto the first layer and comprises a stainless steel.

2. The brake pad of claim 1, wherein there is no adhesive layer between the first layer and the second layer.

3. The brake pad of claim 2, wherein the second layer has a front side and a back side, and wherein the front side is deposited onto the first layer and the back side does not have a layer deposited thereon.

4. The brake pad of claim 1, wherein the back plate, including the hook-shaped locking part and the round support part, further comprises a third layer comprising a stainless steel, wherein the third layer is deposed between the brake friction pad and the first layer.

5. The brake pad of claim 4, wherein there is no adhesive layer between the third layer and the first layer.

* * * * *